(12) United States Patent
Rui et al.

(10) Patent No.: US 10,482,038 B2
(45) Date of Patent: Nov. 19, 2019

(54) PROGRAMMABLE PROTOCOL INDEPENDENT BAR MEMORY FOR SSD CONTROLLER

(71) Applicant: SK hynix Inc., Gyeonggi-do OT (KR)

(72) Inventors: Xianfeng Rui, Sunnyvale, CA (US); Ka Wing Cheung, Milpitas, CA (US); Ryan Yu, Sunnyvale, CA (US); Ananthanarayanan Nagarajan, Palo Alto, CA (US)

(73) Assignee: SK hynix Inc., Gyeonggi-do (KR)

( * ) Notice: Subject to any disclaimer, the term of this patent is extended or adjusted under 35 U.S.C. 154(b) by 202 days.

(21) Appl. No.: 15/219,210

(22) Filed: Jul. 25, 2016

(65) Prior Publication Data

US 2017/0024332 A1    Jan. 26, 2017

Related U.S. Application Data

(60) Provisional application No. 62/196,851, filed on Jul. 24, 2015.

(51) Int. Cl.
*G06F 12/14* (2006.01)
*G06F 13/40* (2006.01)

(52) U.S. Cl.
CPC ...... *G06F 12/1425* (2013.01); *G06F 13/4022* (2013.01); *G06F 2212/1052* (2013.01)

(58) Field of Classification Search
CPC .................. G06F 2212/1052; G06F 13/4022
See application file for complete search history.

(56) References Cited

U.S. PATENT DOCUMENTS

| 9,025,495 B1 * | 5/2015 | Brown ............... H04L 41/082 370/255 |
| 9,104,334 B2 | 8/2015 | Madhusudana et al. |
| 2008/0288661 A1 * | 11/2008 | Galles ................. G06F 13/10 710/3 |
| 2013/0160002 A1 * | 6/2013 | Graham ............ G06F 9/45558 718/1 |
| 2016/0147551 A1 * | 5/2016 | Tsirkin ............... G06F 9/45558 718/1 |

* cited by examiner

*Primary Examiner* — Larry T Mackall
*Assistant Examiner* — Michelle L Taeuber
(74) *Attorney, Agent, or Firm* — IP & T Group LLP (57) ABSTRACT

Memory systems may include a programmable bit control unit suitable for defining read-write properties to locations in a base address register (BAR) memory, a read-write switch suitable for receiving a memory access request, and identifying whether the memory access request is a read access or a write access, and an access control unit suitable for receiving the memory access request from the read-write switch when the memory access request is identified as a write access, determining a read-write property associated with the write access, and processing the write access to a location in the BAR memory with a defined read-write property that is the same as the determined read-write property associated with the write request.

15 Claims, 6 Drawing Sheets

PROGRAMMABLE PROTOCOL INDEPENDENT BAR MEMORY FOR SSD CONTROLLER

CROSS-REFERENCE TO RELATED APPLICATIONS

This application claims the benefit of U.S. Provisional Application No. 62/196,851 filed Jul. 24, 2015, the entire contents of which are incorporated herein by reference.

BACKGROUND

1. Field

Exemplary embodiments of the present disclosure relate to a memory system and an operating method thereof.

2. Description of the Related Art

The computer environment paradigm has shifted to ubiquitous computing systems that can be used anytime and anywhere. Due to this fact, the use of portable electronic devices such as mobile phones, digital cameras, and notebook computers has rapidly increased. These portable electronic devices generally use a memory system having memory devices, that is, a data storage device. The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

To make an SSD controller compatible with multiple host interfaces and updated host protocol specifications, base address registers (BARs) are used. There is a need for improved designs for BAR memory components.

SUMMARY

Aspects of the invention include memory systems. The memory systems may include a programmable bit control unit suitable for defining read-write properties to locations in a base address register (BAR) memory, a read-write switch suitable for receiving a memory access request, and identifying whether the memory access request is a read access or a write access, and an access control unit suitable for receiving the memory access request from the read-write switch when the memory access request is identified as a write access, determining a read-write property associated with the write access, and processing the write access to a location in the BAR memory with a defined read-write property that is the same as the determined read-write property associated with the write request.

Further aspects of the invention include methods. The methods may include defining, with a programmable bit control, read-write properties to locations in a base address register (BAR) memory, receiving, with a read-write switch, a memory access request, identifying, with the read-write switch, whether the memory access request is a read access or a write access, receiving, with an access control unit, the memory access request from the read-write switch when the memory access request is identified as a write access, determining, with the access control unit, a read-write property associated with the write access, and processing, with the access control unit, the write access to a location in the BAR memory with a defined read-write property that is the same as the determined read-write property associated with the write request.

Additional aspects of the invention include memory devices. The memory devices may include a programmable bit control unit configured to define read-write properties to locations in a base address register (BAR) memory, a read-write switch configured to, receive a memory access request, and identify whether the memory access request is a read access or a write access, and an access control unit configured to receive the memory access request from the read-write switch when the memory access request is identified as a write access, determine a read-write property associated with the write access, and process the write access to a location in the BAR memory with a defined read-write property that is the same as the determined read-write property associated with the write request.

DETAILED DESCRIPTION

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily suitable for performing the task at a given time or a specific component that is manufactured to perform the task. As used herein, the term 'processor' refers to one or more devices, circuits, and/or processing cores suitable for processing data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
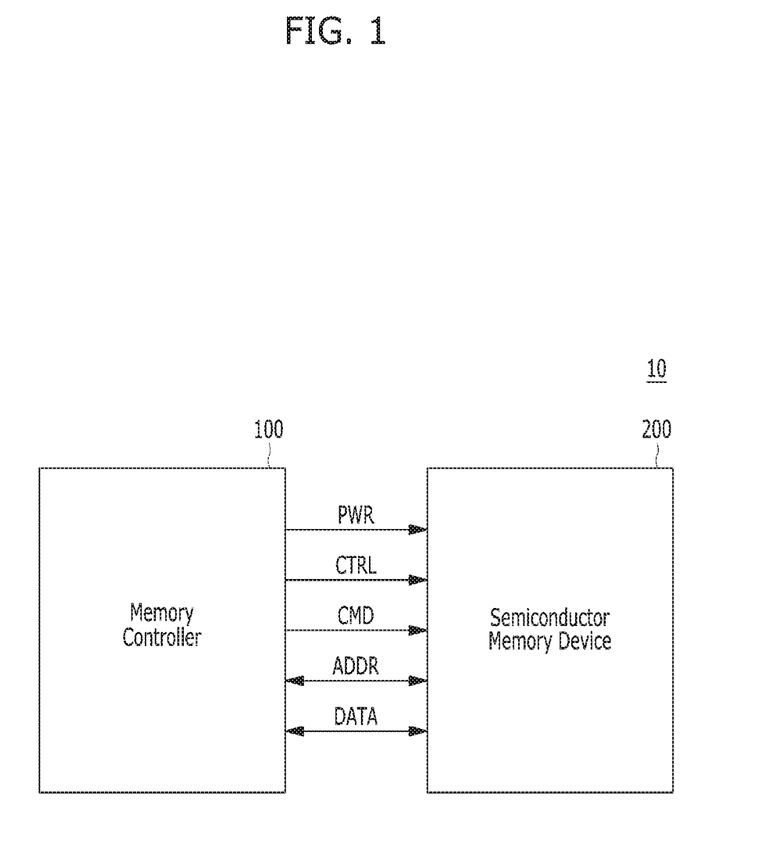
FIG. 1 is a block diagram schematically illustrating a memory system in accordance with an embodiment of the present invention.

FIG. 1 is a block diagram schematically illustrating a memory system 10 in accordance with an embodiment of the present invention.

Referring FIG. 1, the memory system 10 may include a memory controller 100 and a semiconductor memory device 200.

The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines. The semiconductor memory device 200 may receive power PWR through a power line and a control signal CTRL through a control line. The control signal may include a command latch enable (CLE) signal, an address latch enable (ALE) signal, a chip enable (CE) signal, a write enable (WE) signal, a read enable (RE) signal, and so on.

The memory controller 100 and the semiconductor memory device 200 may be integrated in a single semiconductor device. For example, the memory controller 100 and the semiconductor memory device 200 may be integrated in a single semiconductor device such as a solid state drive (SSD). The solid state drive may include a storage device for storing data therein. When the semiconductor memory system 10 is used in an SSD, operation speed of a host (not shown) coupled to the memory system 10 may remarkably improve.

The memory controller 100 and the semiconductor memory device 200 may be integrated in a single semiconductor device such as a memory card. For example, the memory controller 100 and the semiconductor memory device 200 may be integrated in a single semiconductor device to configure a memory card such as a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and a universal flash storage (UFS).

For another example, the memory system 10 may be provided as one of various elements including an electronic device such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, one of electronic devices of a home network, one of electronic devices of a computer network, one of electronic devices of a telematics network, a radio-frequency identification (RFID) device, or elements devices of a computing system.

Figure 2:
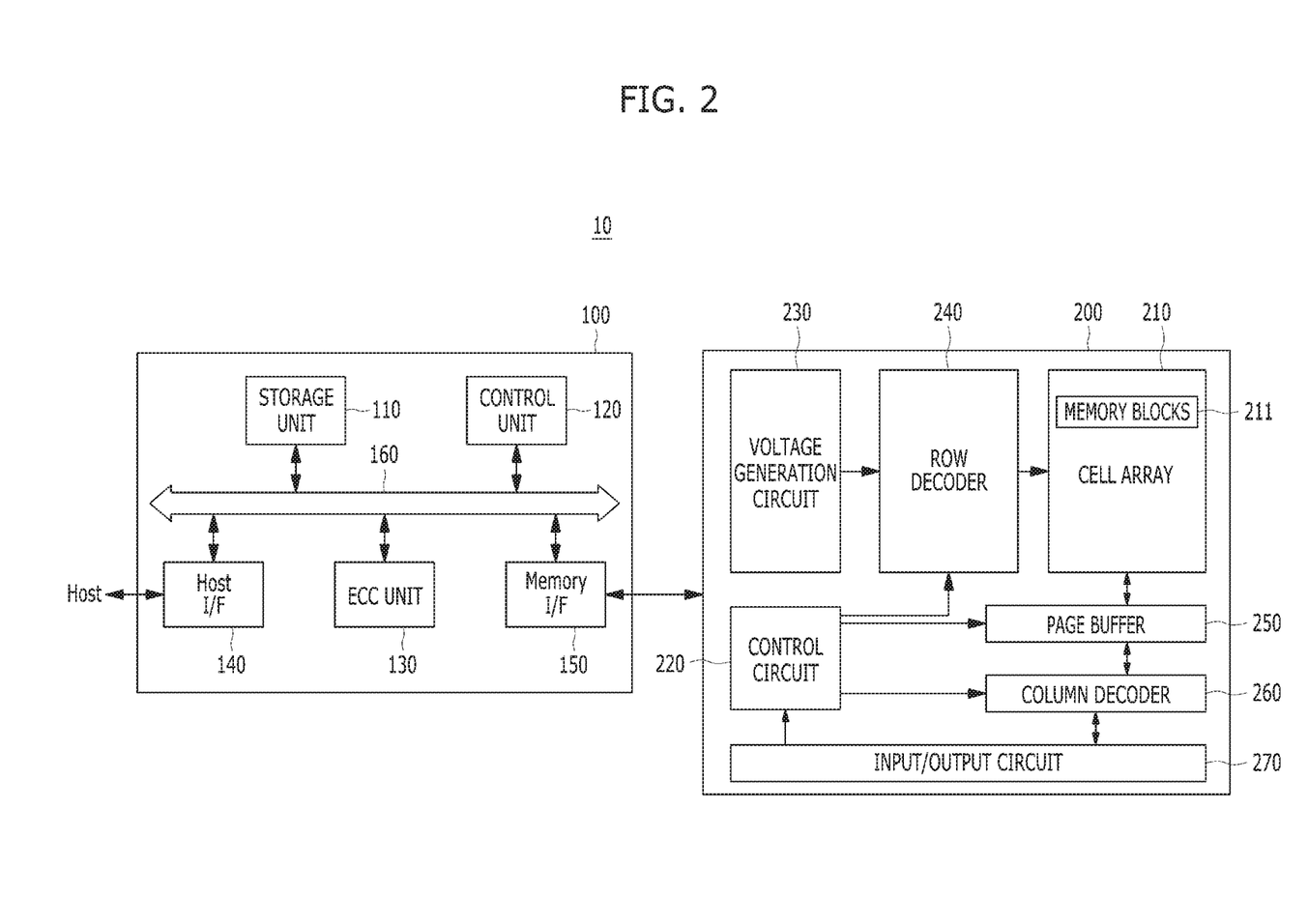
FIG. 2 is a block diagram illustrating a memory system in accordance with an embodiment of the present invention.

FIG. 2 is a detailed block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device, and in particular, store data to be accessed by the host device.

The host device may be implemented with any one of various kinds of electronic devices. In some embodiments, the host device may include an electronic device such as a desktop computer, a workstation, a three-dimensional (3D) television, a smart television, a digital audio recorder, a digital audio player, a digital picture recorder, a digital picture player, a digital video recorder and a digital video player. In some embodiments, the host device may include a portable electronic device such as a mobile phone, a smart phone, an e-book, an MP3 player, a portable multimedia player (PMP), and a portable game player.

The memory device 200 may store data to be accessed by the host device.

The memory device 200 may be implemented with a volatile memory device such as a dynamic random access memory (DRAM) and a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The controller 100 may control storage of data in the memory device 200. For example, the controller 100 may control the memory device 200 in response to a request from the host device. The controller 100 may provide the data read from the memory device 200, to the host device, and store the data provided from the host device into the memory device 200.

The controller 100 may include a storage unit 110, a control unit 120, the error correction code (ECC) unit 130, a host interface 140 and a memory interface 150, which are coupled through a bus 160.

The storage unit 110 may serve as a working memory of the memory system 10 and the controller 100, and store data for driving the memory system 10 and the controller 100. When the controller 100 controls operations of the memory device 200, the storage unit 110 may store data used by the controller 100 and the memory device 200 for such operations as read, write, program and erase operations.

The storage unit 110 may be implemented with a volatile memory. The storage unit 110 may be implemented with a static random access memory (SRAM) or a dynamic random access memory (DRAM). As described above, the storage unit 110 may store data used by the host device in the memory device 200 for the read and write operations. To store the data, the storage unit 110 may include a program memory, a data memory, a write buffer, a read buffer, a map buffer, and so forth.

The control unit 120 may control general operations of the memory system 10, and a write operation or a read operation for the memory device 200, in response to a write request or a read request from the host device. The control unit 120 may drive firmware, which is referred to as a flash translation layer (FTL), to control the general operations of the memory system 10. For example, the FTL may perform operations such as logical to physical (L2P) mapping, wear leveling, garbage collection, and bad block handling. The L2P mapping is known as logical block addressing (LBA).

The ECC unit 130 may detect and correct errors in the data read from the memory device 200 during the read operation. The ECC unit 130 may not correct error bits when the number of the error bits is greater than or equal to a threshold number of correctable error bits, and may output an error correction fail signal indicating failure in correcting the error bits.

In some embodiments, the ECC unit 130 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), a Block coded modulation (BCM), and so on. The ECC unit 130 may include all circuits, systems or devices for the error correction operation.

The host interface 140 may communicate with the host device through one or more of various interface protocols such as a universal serial bus (USB), a multi-media card (MMC), a peripheral component interconnect express (PCI-E), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the CPU 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer 250, a column decoder 260, and an input/output circuit 270. The memory cell array 210 may include a plurality of memory blocks 211 and may store data therein. The voltage generation circuit 230, the row decoder 240, the page buffer 250, the column decoder 260 and the input/output circuit 270 form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages having various levels. For example, in an erase operation, the voltage generation circuit 230 may generate operation voltages having various levels such as an erase voltage and a pass voltage.

The row decoder 240 may be connected to the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks among the plurality of memory blocks 211.

The page buffer 250 is connected to the memory cell array 210 through bit lines BL (not shown). The page buffer 250 may precharge the bit lines BL with a positive voltage, transmit/receive data to/from a selected memory block in program and read operations, or temporarily store transmitted data, in response to a page buffer control signal generated by the control circuit 220.

The column decoder 260 may transmit/receive data to/from the page buffer 250 or transmit/receive data to/from the input/output circuit 270.

The input/output circuit 270 may transmit, to the control circuit 220, a command and an address, transmitted from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

Figure 3:
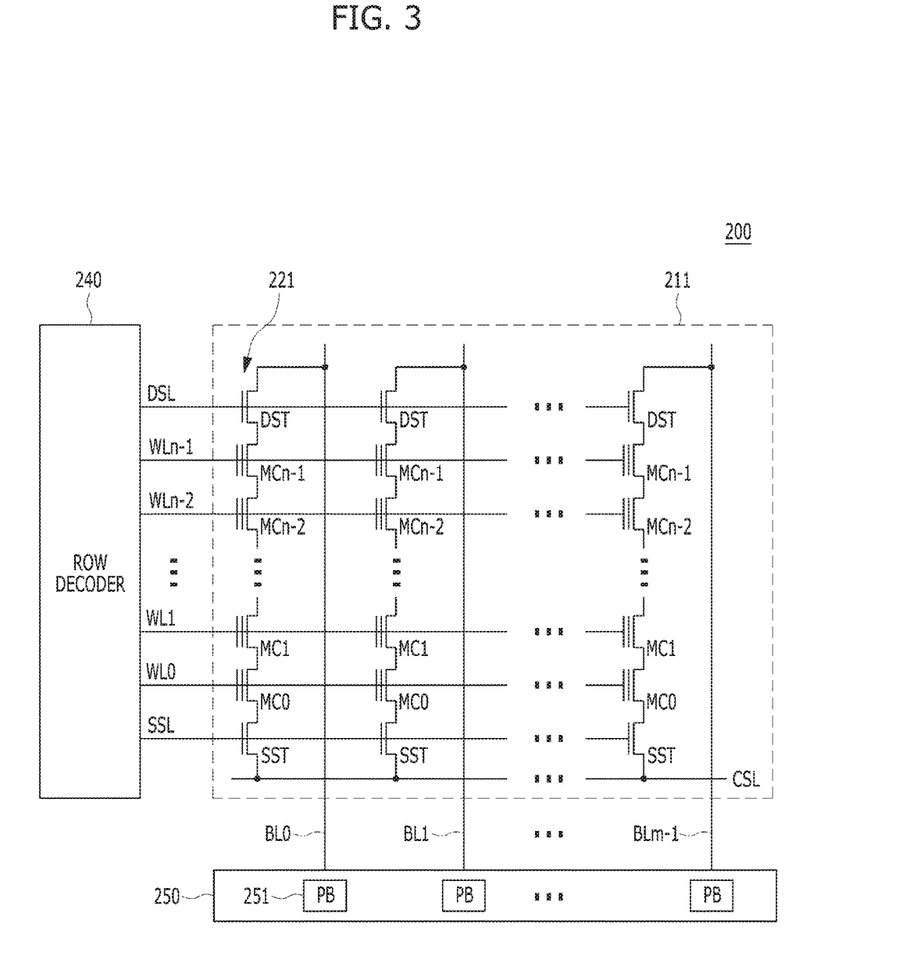
FIG. 3 is a circuit diagram illustrating a memory block of a memory device in accordance with an embodiment of the present invention.

FIG. 3 is a circuit diagram illustrating a memory block of a semiconductor memory device in accordance with an embodiment of the present invention. For example, a memory block of FIG. 3 may be the memory blocks 211 of the memory cell array 200 shown in FIG. 2.

Referring to FIG. 3, the memory blocks 211 may include a plurality of cell strings 221 coupled to bit lines BL0 to BLm−1, respectively. The cell string of each column may include one or more drain selection transistors DST and one or more source selection transistors SST. A plurality of memory cells or memory cell transistors may be serially coupled between the selection transistors DST and SST. Each of the memory cells MC0 to MCn−1 may be formed of a multi-level cell (MLC) storing data information of multiple bits in each cell. The cell strings 221 may be electrically coupled to the corresponding bit lines BL0 to BLm−1, respectively.

In some embodiments, the memory blocks 211 may include a NAND-type flash memory cell. However, the memory blocks 211 are not limited to the NAND flash memory, but may include NOR-type flash memory, hybrid flash memory in which two or more types of memory cells are combined, and one-NAND flash memory in which a controller is embedded inside a memory chip.

As a high throughput and performance-scaling standard, PCI Express (PCIe) provides optimized solutions for NAND flash memory as a storage interface. Host interfaces above PCIe are introduced into SSD controller designs to maximize performance, like NVMe, SOP, AHCI and etc. These interfaces, especially NVMe, are developed and improved very quickly. To make one SSD controller compatible to multiple host interfaces and upcoming host protocol specification updates, base address registers (BARs) are critical elements. Disclosed herein is a programmable BAR memory that achieves protocol independent features and flexibility to host interfaces.

Figure 4:
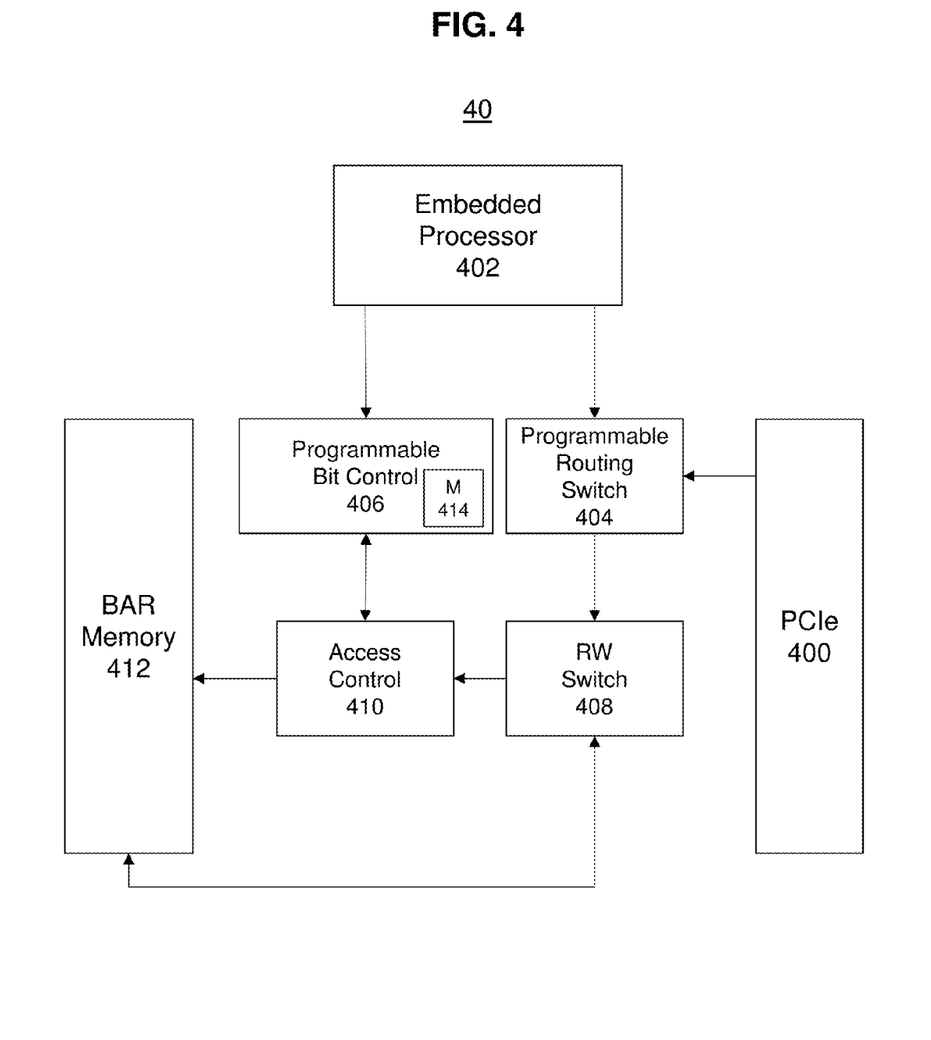
FIG. 4 is a diagram of a system for programming and managing BAR memory according to aspects of the invention.

Referring to FIG. 4, a system 40 for programming and managing BAR memory is shown. The system may include a PCIe 400, an embedded processor 402 (e.g., a controller), a programmable routing switch 404, a programmable bit control unit 406, a read-write (RW) switch 408, an access control unit 410, a BAR memory 412, and a programmable bit control unit memory 414.

Figure 5:
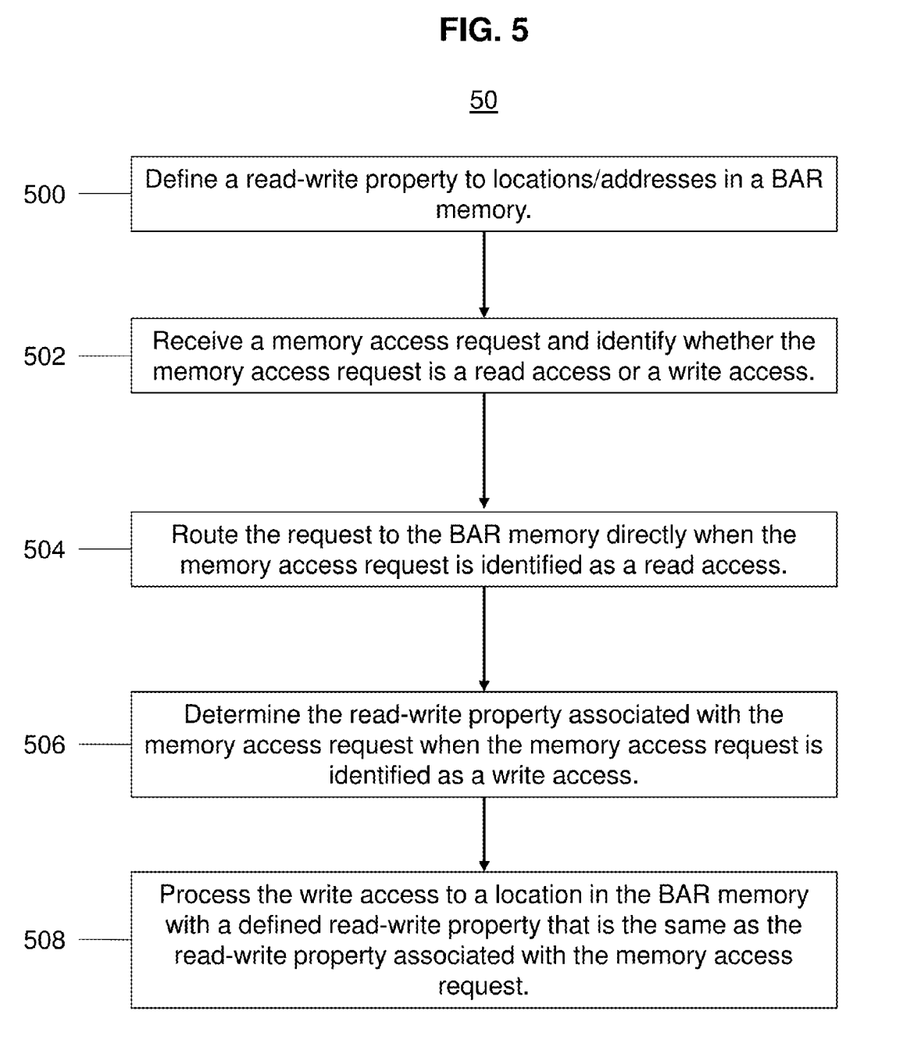
FIG. 5 is a flowchart of steps in a method for programming and managing BAR memory in accordance with aspects of the invention.

FIG. 5 is a flowchart 50 of steps in a method for programming and managing BAR memory. At step 500, read-write properties are defined to locations/addresses in the BAR memory 412. The read-write properties may be defined by the programmable bit control unit 406. The programmable bit control unit 406 may define read-write properties to all locations in the BAR memory 412. Multiple implementations may be used with varying resolutions (e.g., bit, byte, double word (DWs), etc.). Read-write properties may be based on write operation behaviors. For example, the read-write properties may include read-write (RW), read-only (RO), write 1 to clear (RW1C), write 1 to set (RW1S), etc. Additional read-write properties will be understood to those of skill in the art from the description herein.

At step 502, a memory access request is received and it is identified whether the memory access request is a read access or a write access. The access request may be received by the RW switch 408 from the PCIe 400 and/or via the programmable routing switch 404. The RW switch 408 may be configured to differentiate between read accesses and write accesses. Thus, the RW switch 408 may be configured to identify whether the received access request is a read access (e.g., an access that only requires a read from the BAR memory 412) or a write access (e.g., an access that requires some form of writing to the BAR memory 412).

In an example, the RW switch 408 receives the access request from the programmable routing switch 404. The programmable routing switch 404 may be configured to route traffic from correct host addresses to the BAR memory 412. BAR0, BAR1 . . . BAR5 (for example) may be defined in the PCIe 400 controller registers, and the programmable routing switch 404 may be configured to have a programmable policy to define which BAR is legal. Only the traffic to a valid BAR should be routed to BAR memory. In an embodiment, multiple BARs are activated at the same time, and the controller supports multiple host protocols at the same time. The programmable routing switch 404 may also be configured to qualify the BAR base address and size, and prohibit any access outside the BAR range. Parameters in the programmable routing switch 404 may include, for example, in a system with six BARs:

Valid bit for every BAR: VBAR0, VBAR1 . . . VBAR5;
Valid BAR starting address: VADDR0, VADDR1 . . . VADDR5;
Valid BAR size: VSIZE0, VSIZE1 . . . VSIZE5.

Additional or alternative parameters may be utilized to effectuate the invention disclosed herein as will be understood by those of skill in the art.

At step 504, the memory access request is routed directly to the BAR memory 412 when the memory access request is identified as a read access. For example, the RW switch 408 may be configured to route the access request directly to the BAR memory 412 when the RW switch 408 identifies the access request as a read access.

At step 506, when the memory access request is identified as a write request, a read-write property associated with the memory access request is determined. For example, when the RW switch 408 identifies the access request as a write access, it may route the access request to the access control unit 410. The access control unit 410 may be configured to receive the access request from the RW switch 408, decode a host address from the request, and determine the read-write property associated with the write request (e.g., RW, RO, RW1C, RW1S, etc.). The access control unit 410 may also be configured to calculate the destination address of the write access request to the BAR memory 412. The read-write property of the write access may be determined by reading the read-write property from the programmable bit control unit 406.

At step 508, the write access is processed to a location in the BAR memory 412 with a defined read-write property that is the same as the read-write property associated with the write access (memory access request). For example, the access control unit 410 may be configured to process the write access.

In one example, if the read-write property of the write access is RO, then the processing of the write access may be bypassed (e.g., it will not be written to a location in the BAR memory 412 defined as RO). Thus, if the read-write property of the write access is RW, then it will be processed to a location of the BAR memory 412 defined as RW, if the read-write property of the write access is RW1C, it will be processed to a location of the BAR memory 412 defined as RW1C, etc.

Figure 6:
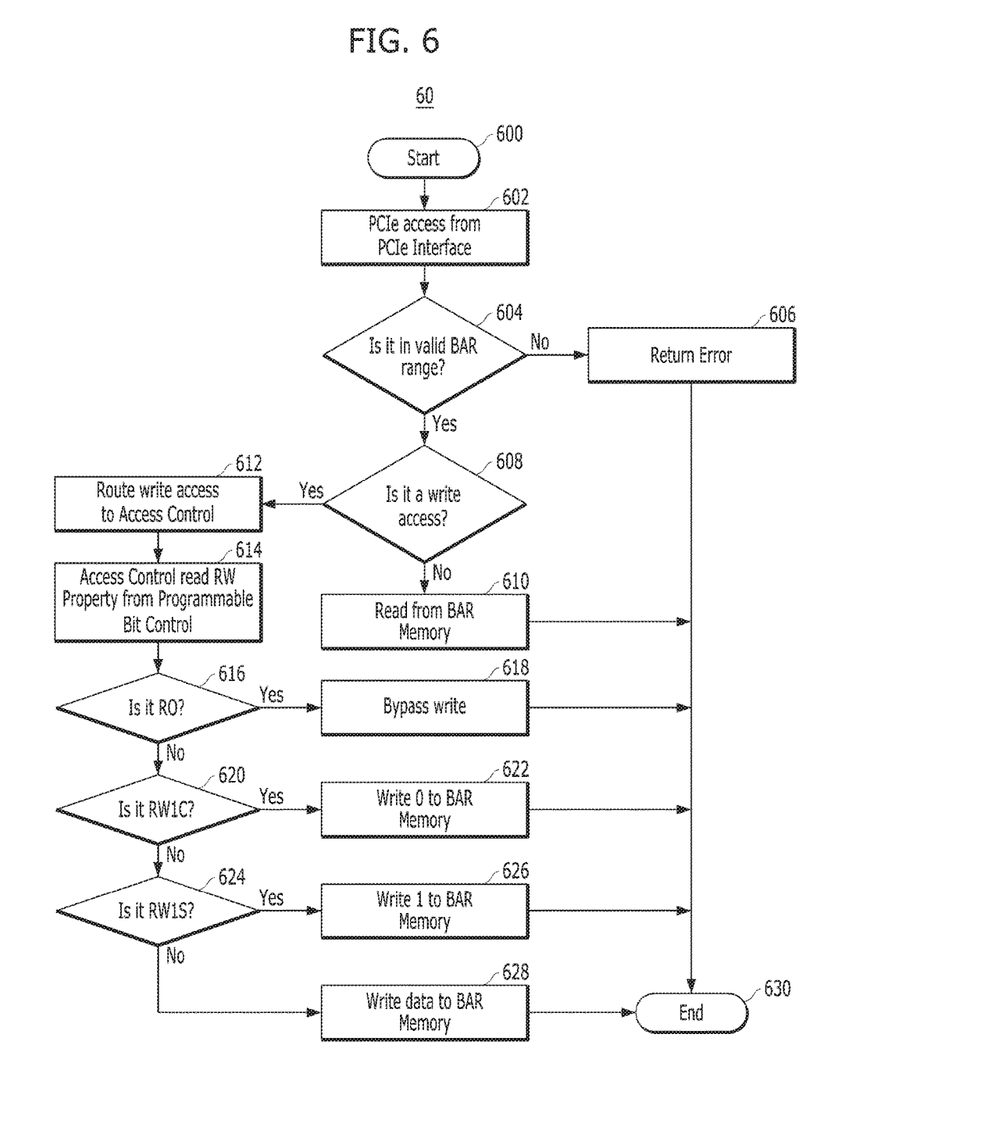
FIG. 6 is an algorithmic flowchart of steps for programming and managing BAR memory according to aspects of the invention.

FIG. 6 is an algorithmic flowchart 60 showing an example of an order of steps and determinations in systems for managing and programming BAR memory. The order and number of steps in the flowchart 60 is exemplary and not exclusive. Those of skill in the art will understand different numbers and orders of steps to effectuate the invention disclosed herein.

At 600, the process starts. At 602, a PCIe access (e.g., a memory access request) is received from the PCIe 400. At 604, it is determined if the access request in within a valid BAR range (e.g., with the programmable routing switch 404). If it is not within a valid BAR range, the system returns an error at 606 and the process ends at 630.

If the request is in a valid bar range, then, at 608, it is identified whether the access request is a read access or a write access (e.g., by the RW switch 408). If the access request is identified as a read access, then the request is sent directly to the BAR memory 412 at 610 and the process ends at 630. If the access request is identified as a write access, the request is routed to the access control unit 410 at 612.

At 614, the access control unit 410 determines the read-write property of the access request. For example, the access control unit 410 may determine the read-write property of the access request by reading the property from the programmable bit control unit 412.

At 616, if the read-write property is RO, the write access is bypassed at 618 and the process ends at 630. At 620, if the read-write property is RW1C, 0 is written to the BAR memory at 622 and the process ends at 630. At 624, if the read-write property is RW1S, 1 is written to the BAR memory at 626 and the process ends at 630. Otherwise, data is written to the BAR memory as having the RW read-write property at 628 and the process ends at 630.

The programmable bit control unit 412 may be implemented in various configurations. For example, one option is to make every BAR location programmable, and define a read-write property for each of the locations. In this case, a 2-bit parameter may be defined for every bit in the BAR memory (e.g., a R/W control (RWC)). It will have 4 possible values representing RO, RW, RW1S and RW1C (e.g., 00, 01, 10, 11). This subsystem will provide high flexibility, but the implementation may need a policy memory (e.g., the programmable bit control unit memory 414) which has double size of the BAR memory. For example, if the BAR memory is 16 KB, the programmable bit control unit memory 414 will be 32 KB.

Another example is to define some locations in the BAR memory which are programmable, while keeping all the others as RO. In this case, besides an R/W control (RWC) parameter, another parameter, Valid Programmable Offset (VPOFF), may be involved. VPOFF is a valid BAR memory offset which points to a DW controlled by a group of 32 RWCs, for example. Each RWC may represent one bit in this DW. This implementation will have reasonable flexibility, but it has very small overhead. For example, if the BAR memory size is 16 KB, and only 16 programmable DWs are needed, the programmable bit control unit 412 will only need 16 control groups. Each group has 1 VPOFF (12 bits) and 32 RWCs (2 bits), totaling 76.

Another example is to combine the previous two examples described above. Instead of using 2 bits for RWCs to represent 4 possible read-write properties, 1 bit is used for RW/RO, because these are the most possible cases in any protocol. In addition, the VPOFF and RWCs control groups may be defined to increase flexibility of some specific location. In the 16 KB BAR memory example, this implementation will need a policy memory 414 slightly bigger than 16 KB.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A memory system, comprising:
a programmable bit controller configured to define read-write properties to locations in a base address register (BAR) memory;
a read-write switch configured to:
receive a memory access request;
identify whether the memory access request is a read access or a write access; and
control routing of the memory access request for further processing based on the identify operation, wherein, when the memory access request is identified as a read access, the memory access request is routed directly to the BAR memory; and
an access controller configured to:
receive the memory access request from the read-write switch when the memory access request is identified as a write access but not when the memory access request is identified as a read access;
determine a read-write property, among a plurality of read-write properties including a first read-write property, associated with the write access;
bypass the write access when the read-write property is determined to be the first read-write property; and
process the write access to a location in the BAR memory with a defined read-write property that is the same as the determined read-write property associated with the write request, when the read-write property is determined to be any other of the plurality of read-write properties.

2. The memory system of claim 1, wherein the first read-write property includes read-only, and the other read-write properties include read-write 1 to clear, read-write 1 to set, and read-write.

3. The memory system of claim 2, wherein the access controller is further configured to write 0 to the BAR memory when the read-write property associated with the write access is read-write 1 to clear, and to write 1 to the BAR memory when the read-write property associated with the write access is read-write 1 to set.

4. The memory system of claim 1, wherein the access controller is further configured to calculate a destination address of the write access in the BAR memory.

5. The memory system of claim 1, wherein the read-write properties are defined to locations in the BAR memory by a 2-bit parameter.

6. A method, comprising:
defining, with a programmable bit controller, read-write properties to locations in a base address register (BAR) memory;
receiving, with a read-write switch, a memory access request;
identifying, with the read-write switch, whether the memory access request is a read access or a write access;
controlling, with the read-write switch, routing of the memory access request for further processing based on the identifying operation, wherein, when the memory access request is identified as a read access, the memory access request is routed directly to the BAR memory;
receiving, with an access controller, the memory access request from the read-write switch when the memory access request is identified as a write access but not when the memory access request is identified as a read access;
determining, with the access controller, a read-write property, among a plurality of read-write properties including a first read-write property, associated with the write access;
bypass the write access when the read-write property is determined to be the first read-write property; and
processing, with the access controller, the write access to a location in the BAR memory with a defined read-write property that is the same as the determined read-write property associated with the write request, when the read-write property is determined to be any other of the plurality of read-write properties.

7. The method of claim 6, wherein the first read-write property includes read-only, and the other read-write properties include read-write 1 to clear, read-write 1 to set, and read-write.

8. The method of claim 7, further comprising writing 0 to the BAR memory when the read-write property associated with the write access is read-write 1 to clear, and writing 1 to the BAR memory when the read-write property associated with the write access is read-write 1 to set.

9. The method of claim 6, further comprising calculating a destination address of the write access in the BAR memory.

10. The method of claim 6, wherein the read-write properties are defined to locations in the BAR memory by a 2-bit parameter.

11. A memory device, comprising:
a programmable bit controller configured to define read-write properties to locations in a base address register (BAR) memory;
a read-write switch configured to:
receive a memory access request;
identify whether the memory access request is a read access or a write access; and
control routing of the memory access request for further processing based on the identify operation, wherein, when the memory access request is identified as a read access, the memory access request is routed directly to the BAR memory; and an access controller configured to:
- receive the memory access request from the read-write switch when the memory access request is identified as a write access but not when the memory access request is identified as a read access;
- determine a read-write property, among a plurality of read-write properties including a first read-write property, associated with the write access;
- bypass the write access when the read-write property is determined to be the first read-write property; and
- process the write access to a location in the BAR memory with a defined read-write property that is the same as the determined read-write property associated with the write request, when the read-write property is determined to be any other of the plurality of read-write properties.

12. The memory device of claim 11, wherein the first read-write property includes read-only, and the other read-write properties include read-write 1 to clear, read-write 1 to set, and read-write.

13. The memory device of claim 12, wherein the access controller is further configured to write 0 to the BAR memory when the read-write property associated with the write access is read-write 1 to clear, and to write 1 to the BAR memory when the read-write property associated with the write access is read-write 1 to set.

14. The memory device of claim 11, wherein the controller is further configured to calculate a destination address of the write access in the BAR memory.

15. The memory device of claim 11, wherein the read-write properties are defined to locations in the BAR memory by a 2-bit parameter.

* * * * *